(No Model.)
T. L. JENNISON.
ADJUSTABLE HAMMOCK SUPPORT.
No. 259,314. Patented June 13, 1882.
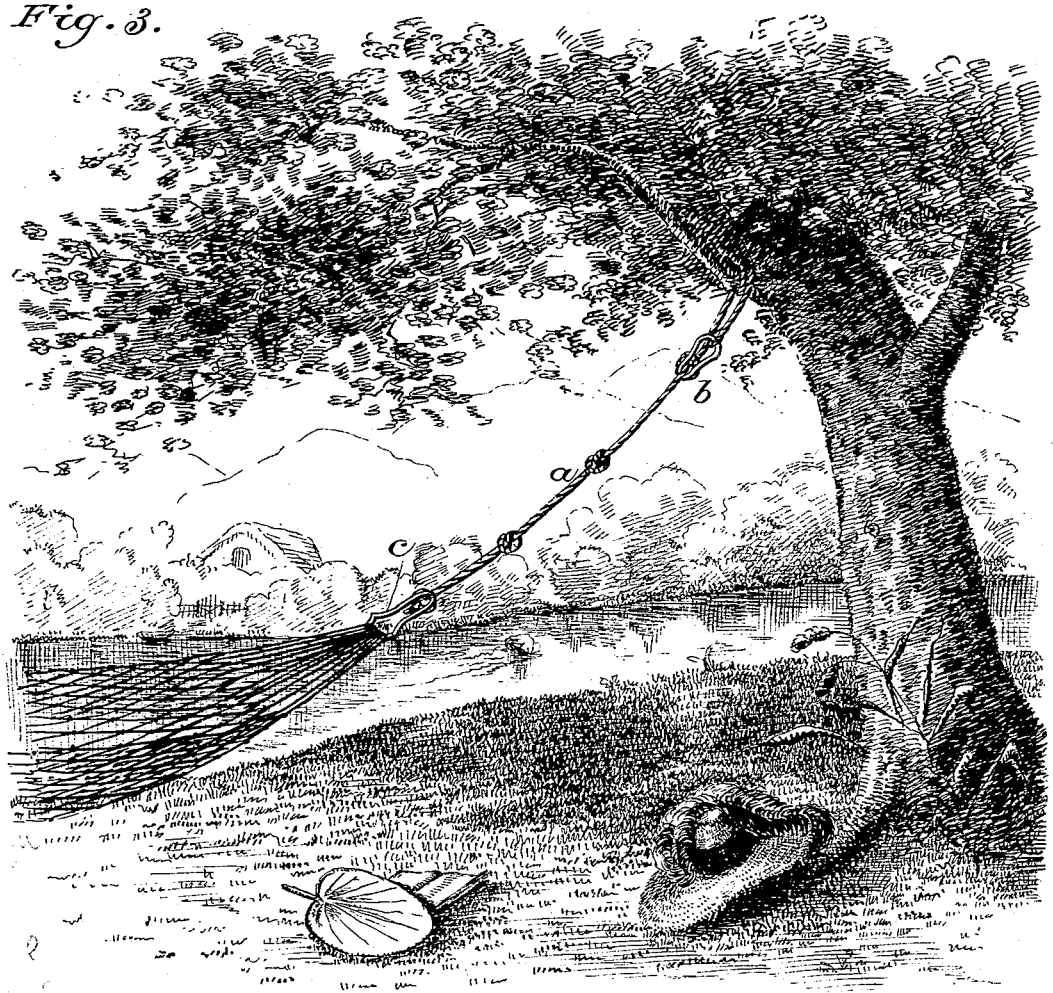
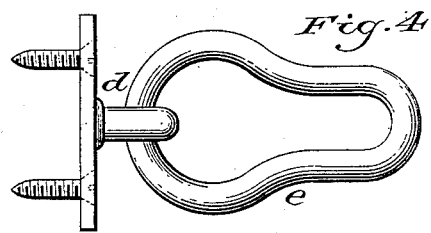
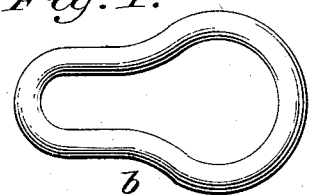
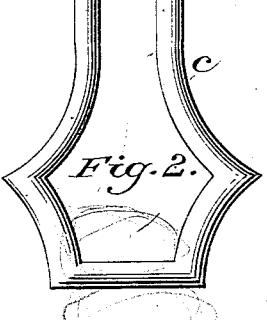
Witnesses:
John F. Hughes
John F. Arnold
Inventor:
Timothy L. Jennison
By Willis E. Parsons, Atty

UNITED STATES PATENT OFFICE.

TIMOTHY L. JENNISON, OF FOXCROFT, MAINE.

ADJUSTABLE HAMMOCK-SUPPORT.

SPECIFICATION forming part of Letters Patent No. 259,314, dated June 13, 1882.

Application filed March 22, 1882. (No model.)

*To all whom it may concern:*

Be it known that I, TIMOTHY L. JENNISON, of Foxcroft, in the county of Piscataquis and State of Maine, have invented a new and useful Adjustable Hammock-Support; and I hereby declare the following to be a full, clear, and exact description thereof, which will enable others to make and use the same, reference being had to the accompanying drawings, forming a part of this specification, in which—

Figure 1 represents the link which is to be attached to the end of the rope which fastens around a tree or hammock-standard. Fig. 2 represents the link which is to be attached to the hammock, and around the large end of which the hammock is to be woven. Fig. 3 shows a view in elevation of my invention with one end attached to a tree, the other attached to the hammock, with the hammock end facing, so as to show the shape of link and mode of fastening. Fig. 4 represents two links, (marked *d* and *e*,) which will go with the adjustable hammock-support, to be attached to houses, piazzas, and other stationary objects which the rope cannot be put around.

The object of my invention is to furnish a hammock-support which is easily attached at either end, instantly adjusted by raising or lowering either end, and as easily and quickly detached from the hammock by the combination of the knotted rope *a*, as represented in Fig. 3, with the link *b*, as represented in said figure, and the link *c*, to which the hammock is attached, as represented in said figure, the links *b* and *c* also being represented in the accompanying drawings by Figs. 1 and 2.

The link *b* is large at one end and small at the other, so that the knotted rope, being thrown once or twice around the tree and passed through the large end, slips into the small end of the link, catching onto a knot, and remaining fast. The other end of the rope is simply passed through the link attached to the hammock, catching on the knot at the end.

As will be readily seen by referring to the drawings, the hammock is adjusted, raised, or lowered by simply sliding the link over the knots at either end of the rope.

What I claim as my invention, and desire to secure by Letters Patent, is—

1. A hammock combined with a support or sling having knots or projections along its body portion, and provided at its ends with attaching mechanism, substantially as described, whereby the hammock can be adjusted to fixed positions.

2. An adjusting support or sling for hammocks, consisting of a rope knotted along its body portion, and provided at each end with an attaching link whose opening is contracted at one end and expanded at the other, substantially as shown and described, for the purpose set forth.

TIMOTHY L. JENNISON.

Witnesses:
AUGUSTUS G. LEBROKE,
JOHN F. ARNOLD.